United States Patent
Togino

(10) Patent No.: US 7,167,307 B2
(45) Date of Patent: Jan. 23, 2007

(54) PROJECTION SCREEN, AND PROJECTION TYPE DISPLAY SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 231 days.

(21) Appl. No.: 10/913,488

(22) Filed: Aug. 9, 2004

(65) Prior Publication Data

US 2005/0030489 A1 Feb. 10, 2005

(30) Foreign Application Priority Data

Aug. 8, 2003 (JP) .............................. 2003-289904

(51) Int. Cl.
*G03B 21/60* (2006.01)
*G03B 21/56* (2006.01)
*G03B 3/08* (2006.01)

(52) U.S. Cl. ...................... 359/457; 359/459; 359/460; 359/742; 359/743

(58) Field of Classification Search ................ 359/457, 359/459, 742, 743, 460
See application file for complete search history.

(56) References Cited

U.S. PATENT DOCUMENTS 5,457,572 A * 10/1995 Ishii et al. .................. 359/457

| | | | |
|---|---|---|---|
| 6,700,712 B2 * | 3/2004 | Servatius et al. | 359/742 |
| 6,989,929 B2 * | 1/2006 | Watanabe | 359/457 |
| 2005/0030622 A1 * | 2/2005 | Morita et al. | 359/464 |

FOREIGN PATENT DOCUMENTS

| JP | 60-064302 | 4/1985 |
|---|---|---|
| JP | 2000-122176 | 4/2000 |

* cited by examiner

*Primary Examiner*—Melissa Jan Koval
(74) *Attorney, Agent, or Firm*—Kenyon & Kenyon LLP

(57) ABSTRACT

The invention relates to a projection screen and a projection type display device, wherein projection light projected through a single projector is intensively diffused into at least two areas of view, each having a relatively narrow extent, so that the same image can be simultaneously viewed with both eyes or by at least two viewers. The projection screen 1 comprises a plurality of Fresnel concave mirrors 2L and 2R superposed on the same substrate in a mutually decentered fashion, and a diffusing plate is located on the side of the projection screen 1 on which projection light is incident or at which projection light is reflected.

23 Claims, 14 Drawing Sheets

FIG. 5(a)
FIG. 5(b)
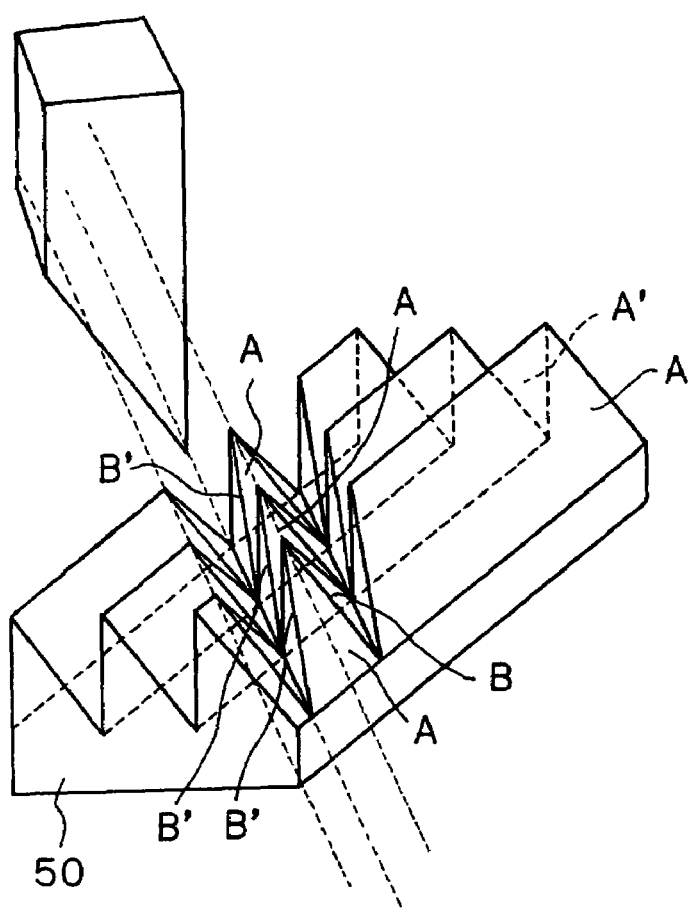
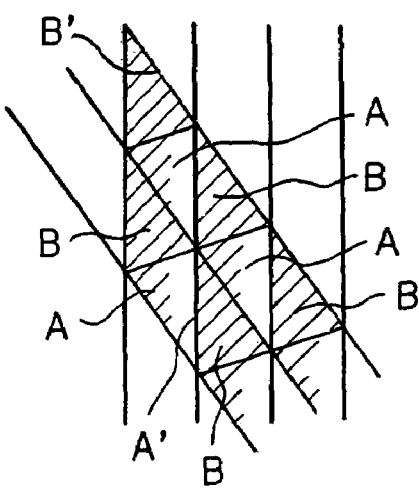

PROJECTION SCREEN, AND PROJECTION TYPE DISPLAY SYSTEM

This application claims benefit of Japanese Application No. 2003-289904 file in Japan on Aug. 8, 2003, the contents of which are incorporated by this reference.

BACKGROUND OF THE INVENTION

The present invention relates generally to a projection screen and a projection type display system, and more particularly to a projection type display system that enables a single image projected onto a projection screen to be viewed from at least two different directions at the same time, and a projections screen used with the same.

So far, it is general that to allow an image projected from a single projector to be simultaneously viewed from a plurality of different directions, projection light is diffused through a projection screen having a large angle of diffusion in a wide range, in which different viewers or both eyes are positioned to view a projected image.

Patent Publication 1
JP-A 2003-177221
Patent Publication 2
JP-A 9-127312
Patent Publication 3
JP-A 2000-171618

However, the use of a projection screen having a large angle of diffusion causes projection light from a single projector to be diffused over a wide range, and to enable bright images to be viewed at individual positions, a strong illumination light source must be used, resulting unavoidably in an increase in the size of the projector and increased power consumption.

In view of such problems with the prior art, a primary object of the present invention is to provide a projection screen and a projection type display system adapted to diffuse projection light from a single projector intensively into at least two viewing areas each having a relatively narrow extent, so that two or more viewers can view the same image at the same time.

According to the present invention, this object is achievable by the provision of a projection screen, characterized in that a plurality of Fresnel concave mirrors are superposed on the same substrate in a mutually decentered fashion.

Preferably in this case, a diffusing plate is located on a side of the projection screen on which projection light is to be incident or a side of the projection screen at which projection light is to be reflected.

For the diffusing plate, it is desired to use a diffusing plate comprising a transmission hologram.

The present invention also includes a projection type display system comprising an image display device, a projection optical system for magnifying and projecting an image displayed on said image display device and a projection screen located in the vicinity of an image projected through said projection optical system, characterized in that said projection screen comprises any one of those as recited above.

With the projection screen of the invention wherein a plurality of Fresnel concave mirrors are superposed on the same substrate in a mutually decentered fashion, projection light projected from a single projector can be intensively directed to at least two viewing areas each having a relatively narrow extent, so that the same image can be viewed at the same time by both eyes or two or more viewers.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 5(a) and 5(b) are a perspective and a plan view showing the surface configuration of the substrate obtained through the steps shown in FIGS. 3 and 4.

DESCRIPTION OF THE PREFERRED EMBODIMENTS

Figure 1:
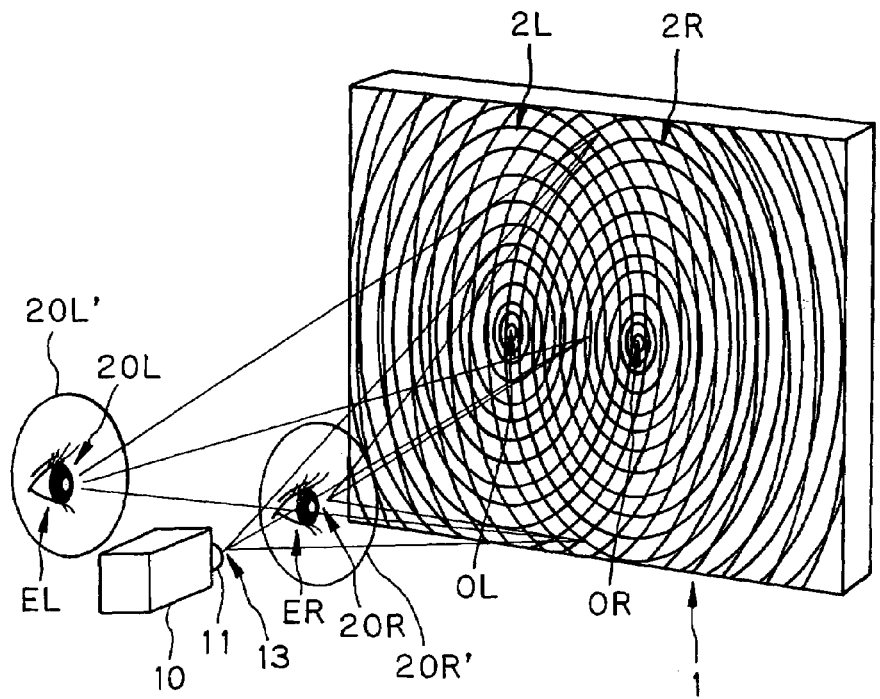
FIG. 1 is illustrative in perspective of the conception of the projection type display system and projection screen according to the invention.
Figure 2:
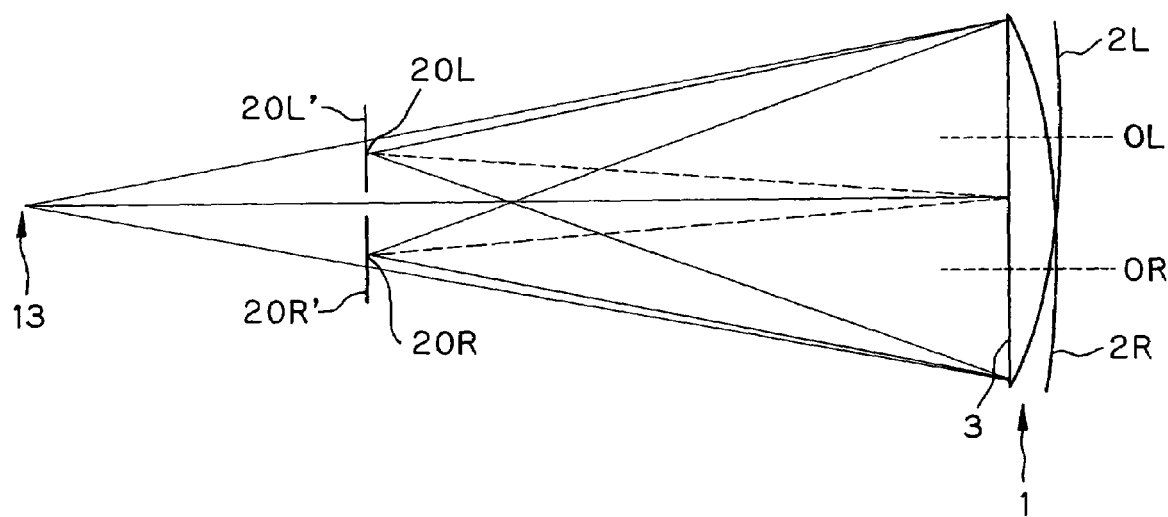
FIG. 2 is an optical path diagram for Example 1 of the invention, as viewed in a horizontal direction.

FIGS. 1 and 2 are illustrative in conception of the projection type display system and projection screen according to the invention. Specifically, FIG. 1 is a perspective view of the projection type display system and projection screen according to the invention and FIG. 2 is an optical path diagram for FIG. 1, as viewed in a horizontal direction. The projection type display system comprises a projector 10 having therein an image display device and a projection optical system 11 for magnifying and projecting an image indicated on that image display device, and a projection screen 1 located near an image projected through the projection optical system 11 in the projector 10, wherein the projection screen 1 is a reflection type screen.

The projection screen 1 comprises a diffusing plate 3 located near an image projected through the projection optical system 11, one Fresnel concave mirror 2L for projecting the pupil of the projection optical system 11 as an entrance pupil 13 in one viewing direction or, specifically, onto one exit pupil 20L in the vicinity of the left eye EL of a viewer as depicted in FIG. 1, and another Fresnel concave mirror 2R for projecting the same exit pupil 13 in another viewing direction or, specifically, onto another exit pupil 20R in the vicinity of the right eye ER of the viewer as depicted in FIG. 1. The diffusing plate 3 is located either in close contact with or in the vicinity of the Fresnel concave mirrors 2L and 2R.

In FIG. 2, the Fresnel concave mirrors 2L and 2R are shown with mutually decentered centers OL and OR. In practical applications, however, they assume on a planar form wherein reflecting surfaces, each in a conically zonal shape, are concentrically joined to the centers OL and OR. As will be described later, two Fresnel concave mirrors 2L and 2R are simultaneously superposed on the same plane, so that a light beam incident from the entrance pupil 13 defined by the pupil of the projection optical system 11 onto the vicinity of one point on the projection screen 1 can be simultaneously reflected at two Fresnel concave mirrors 2L and 2R in separate directions, entering the exit pupils 20L and 20R, respectively.

Thus, the viewer can view an image disiplayed on the projector 10 with both eyes and at the same time by putting the left and right eyes EL and ER in alignment with the exit pupils 20L and 20R.

It is here noted that in the projection screen 1 of the invention, a common single diffusing plate 3 is located in the vicinity of an image projected through the projector 10. Since that diffusing plate 3 is allowed to have narrow diffusibility, the exit pupils 20L and 20R can be magnified to exit pupils 20L' and 20R' of easy-to-view size even when their diameters are small as shown in FIG. 1. Consequently, even though the positions of the viewer's eyes EL and ER are more or less out of alignment with the positions of the exit pupils 20L and 20R, the projected image can be viewed as long as they are in alignment with the magnified exit pupils 20L' and 20R'. It is thus possible to provide an easy-to-view projection type display system. Further, since the projection light from the projector 10 is focused to two such magnified exit pupils 20L' and 20R', it is possible to make the best use of illumination light. In other words, a projection type display system capable of showing bright images is achievable even with an illumination light source having low power.

Instead of the Fresnel concave mirror 2L, 2R, a Fresnel convex lens could be used together with a reflecting mirror located on its back surface. Rather than the projection screen 1 constructed as the reflection type, a transmission type screen could also be used. In this case, mutually decentered Fresnel convex lenses could be used in lieu of the Fresnel concave mirrors 2L and 2R. In this case, the diffusing plate 3 could have the same function as is the case with the reflection type screen. Alternatively, mutually decentered three or more Fresnel concave mirrors or Fresnel convex lenses could be used for the Fresnel concave mirrors 2L and 2R or the Fresnel convex lenses. In this case, three or more exit pupils 20L, 20R that are an image of one entrance pupil 13 are formed with the formation of three or more magnified exit pupils 20L', 20R', so that the same image can be viewed simultaneously from three or more different directions.

Figure 3:
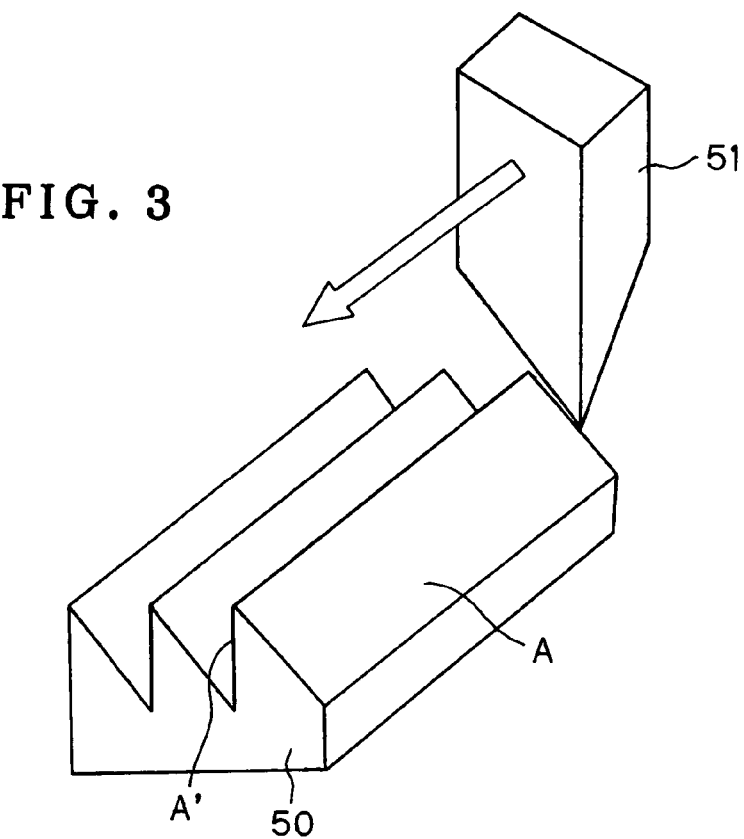
FIG. 3 is illustrative of how grooves (ridges) defined by active and inactive facets for the first Fresnel concave mirror or convex lens are formed in the surface of a substrate that forms a Fresnel concave mirror or a Fresnel convex lens, using a cutting tool.
Figure 4:
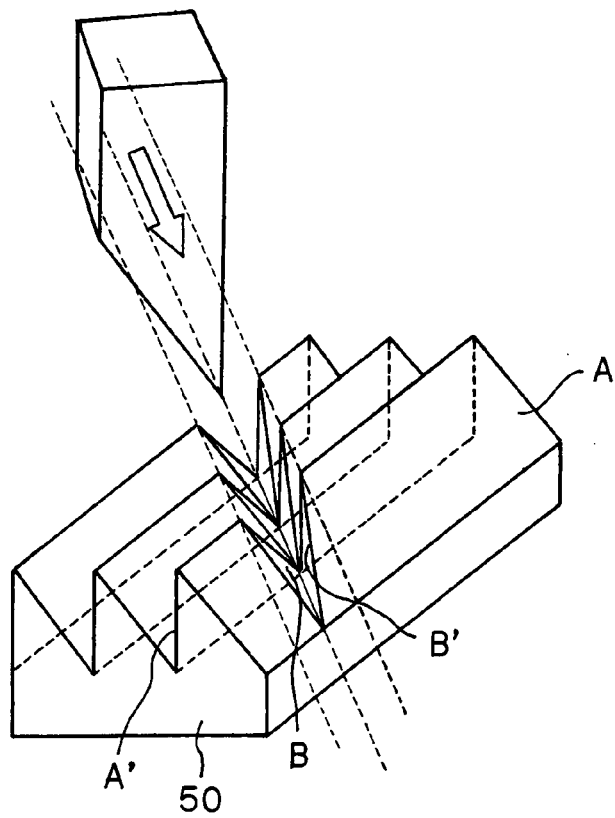
FIG. 4 is illustrative of how similar grooves (ridges) for the second Fresnel concave mirror or convex lens are formed after formation of the grooves (ridges) for the first Frensel concave mirror or convex lens.

An account is now given of what happens with a plurality of Fresnel concave mirrors or Fresnel convex lenses superposed in a mutually decentered fashion. In this case, a light beam incident near one point is simultaneously subject to reflections or refractions by the Fresnel concave mirrors or Fresnel convex lenses, propagating in separate directions. FIG. 3 is illustrative of how grooves (ridges), each comprising an active facet A and an inactive facet A' for the first Fresnel concave mirror or Fresnel convex lens, are microscopically, substantially parallel formed in the surface of a substrate 50 that forms the Fresnel concave mirror or Fresnel convex lens, using a cutting tool 51. Usually, the active facets A for the Fresnel concave mirror or Fresnel convex lens make a relatively large angle with the surface of the substrate 50 while the inactive facets A' are substantially vertical to the surface of the substrate 50. FIG. 4 is illustrative of how grooves (ridges), each comprising an active facet B and an inactive facet B' for the second Fresnel concave mirror or Fresnel convex lens, are microscopically, substantially parallel formed after the formation of the grooves (ridges) for the first Fresnel concave mirror or Fresnel convex lens. As shown in FIG. 4, the grooves (ridges) for the first Fresnel concave mirror or Fresnel convex lens cross the grooves (ridges) for the second Fresnel concave mirror or Fresnel convex lens in almost every area. As the grooves (ridges) for the second Fresnel concave mirror or Fresnel convex lens are formed, a set of quadrangular prisms, each defined by four facets A, B, A' and B', are formed parallel on the surface of the substrate 50, as can be seen from FIG. 5(a). FIG. 5(b) is a plan view of that set of quadrangular prisms. From the entrance side for the light beam, the inactive facets A' and B' look as lines; the active facets A for the first Fresnel concave mirror or Fresnel convex lens and the active facets B for the second Fresnel concave mirror or Fresnel convex lens are alternately and closely packed together in the two-dimensional direction as shown. Referring here to a light beam incident on one point on the substrate (strictly speaking, on an area of some extent), it is subject to area division; a component incident on the facets A is subject to the action of the first Fresnel concave mirror or Fresnel convex lens and a component incident on the facets B is subject to the action of the second Fresnel concave mirror or Fresnel convex lens. As a consequence, the light beam is simultaneously subject to reflection or refraction by the first Fresnel concave mirror or Fresnel convex lens and reflection or refraction by the second Fresnel concave mirror or Fresnesl convex lens, propagating in two separate directions. As explained with reference to FIGS. 1 and 2, the light beam from the pupil (entrance pupil 13) of the projection optical system 11 incident on the vicinity of each point on the projection screen 1 is simultaneously reflected at the two Fresnel concave mirrors 2L, 2R in separate directions, entering the associated exit pupils 20L, 20R in much the same quantity of light, so that images of much the same brightness can be simultaneously viewed. The explanation of the above embodiment wherein two Fresnel concave mirrors or Fresnel convex lenses are superposed on the same substrate in a mutually decentered fashion also holds true for embodiments with three or more such mirrors or lenses superposed.

The diffusing plate 3 used herein has a minute pit-and-projection or roughened surface having diffusibility plus directivity. Preferably in this case, the diffusing plate 3 should have an angle of diffusion of up to 20° at full width half maximum. That the diffusing plate 3 has an angle of diffusion of greater than 20° at full width half maximum means too large an angle of diffusion. In this case, the range of view becomes wide, but the brightness of an image under observation decreases, leading to the need of using a bulkier illumination device for illuminating an object under observation. More preferably, the angle of diffusion of the diffusing plate 3 should be at least 10° at full width half maximum.

For the diffusing plate 3 that satisfies such conditions as set forth above, those fabricated by the fabrication method disclosed in Patent Publication 1 could be used. For instance:

(1) A diffusing plate fabricated by sandblasting. Spherical beads having limited diameters are blown onto a substrate, so that a group of concave facets or a group of facets similar to such facets or convex facets complementary to such facets can be formed on the surface of the substrate. In these groups, the facets are at random, defining a diffusing surface.

(2) A diffusing plate fabricated by sandblasting plus copying. Spherical beads are blown onto a metal substrate to form a group of randomly arranged concave facets. This metal substrate is used as a master to copy the group of randomly arranged concave facets to a transparent substrate, so that a diffusing plate can be fabricated.

(3) A diffusing plate fabricated by sandblasting plus transfer. First, a metal substrate is provided with a layer. Then, spherical beads are blown onto the layer on the metal substrate to form a group of randomly arranged concave facets. Subsequently, the group of randomly arranged concave facets formed on the layer is similarly transferred onto the surface of the metal substrate. Finally, the metal substrate is used as a master to copy the group of randomly arranged concave facets to a transparent substrate, so that a diffusing plate can be fabricated.

(4) In the diffusing plate (1), (2) or (3), glass beads having a diameter of 0.01 mm to 2 mm are used as the spherical beads.

(5) In the diffusing plate (4), the spherical beads are blown at a pneumatic pressure of 0.5 to 3.0 kg/cm$^2$.

(6) In the diffusing plate according to any one of (2), (4) and (5), the metal substrate is a brazen substrate.

(7) In the diffusing plate according to any one of (3), (4) and (5), the metal substrate is formed of a metal whose hardness is higher than that of the spherical beads.

(8) In the diffusing plate according to any one of (2) to (7), injection molding or press molding is used to copy the group of concave facets formed on the surface of the metal substrate to the transparent substrate.

(9) A diffusing plate fabricated by a method wherein resin droplets are sprayed onto a substrate to form a group of randomly arranged convex facets, and the group of randomly arranged convex facets is similarly transferred onto the surface of the substrate or a group of concave facets complementary to the group of convex facets is transferred onto the surface of the substrate.

In addition, the diffusing plate set forth in Patent Publication 2, too, could be used. This diffusing plate is fabricated by roughening one or both sides of a transparent substrate, for instance. One or both sides of the transparent substrate, for instance, could be roughened by the following methods (1) to (4).

(1) Etching; that is, one or both sides of the transparent substrate are etched.

(2) Coating or printing; that is, a resin or filler is provided on one or both side of the transparent substrate in a single layer or multilayer form by means of coating or printing. If required, a painting material or ink dispersed in water or an organic solvent is used.

(3) Electrostatic or electrodepositing coating of powders; that is, a resin or filler or their mixture is provided on one or both sides of the transparent substrate by means of electrostatic or electrodepositing coating.

(4) Film formation by extrusion molding, injection molding or the like; that is, an organic or inorganic filler together with a resin is melted with the application of heat and pressure, and the melt is formed into a film by extrusion molding, injection molding or the like. The resulting diffusing plate should preferably have a HAZE value (JIS K7105) in the range of 10 to 40.

Furthermore, the diffusing plate fabricated according to Patent Publication 3, too, could be used. This method of fabricating a diffusing plate comprises the steps of laminating a binder layer directly or via an additional layer on a substrate, embedding a filler material into the binder layer by means of a pressurizing medium, and removing extra filler deposited onto the laminate.

A diffusing plate composed of a hologram could be used as the diffusing plate 3 in the projection screen 1 according to the invention. A transmission hologram, and a reflection hologram would be used as possible hologram diffusing plates. Referring to a hologram recorded in a volume type photosensitive material, the transmission hologram is of low wavelength selectivity whereas the reflection hologram is of high wavelength selectivity. For a projection display system that presents color images, it is necessary to multi-record three hologram interference fringes, thereby diffusing light components of three R (red), G (green) and B (blue) wavelengths. For this reason, it is preferable to use a transmission hologram of relatively low wavelength selectivity as the hologram. For a projection display system of small size, it is preferable that a Fresnel concave mirror or a Fresnel convex lens is used in combination with a diffusing plate comprising such a transmission hologram. While a projection screen incorporating a diffusing plate 3' comprising such a transmission hologram and only one Fresnel concave mirror 2 is now explained for the sake of simplicity, it should be understood that, in actual applications, the diffusing plate 3' comprising a transmission hologram is located in close contact with or in the vicinity of the entrance sides of two or more mutually decentered Fresnel concave mirrors 2L, 2R.

Figure 6A:
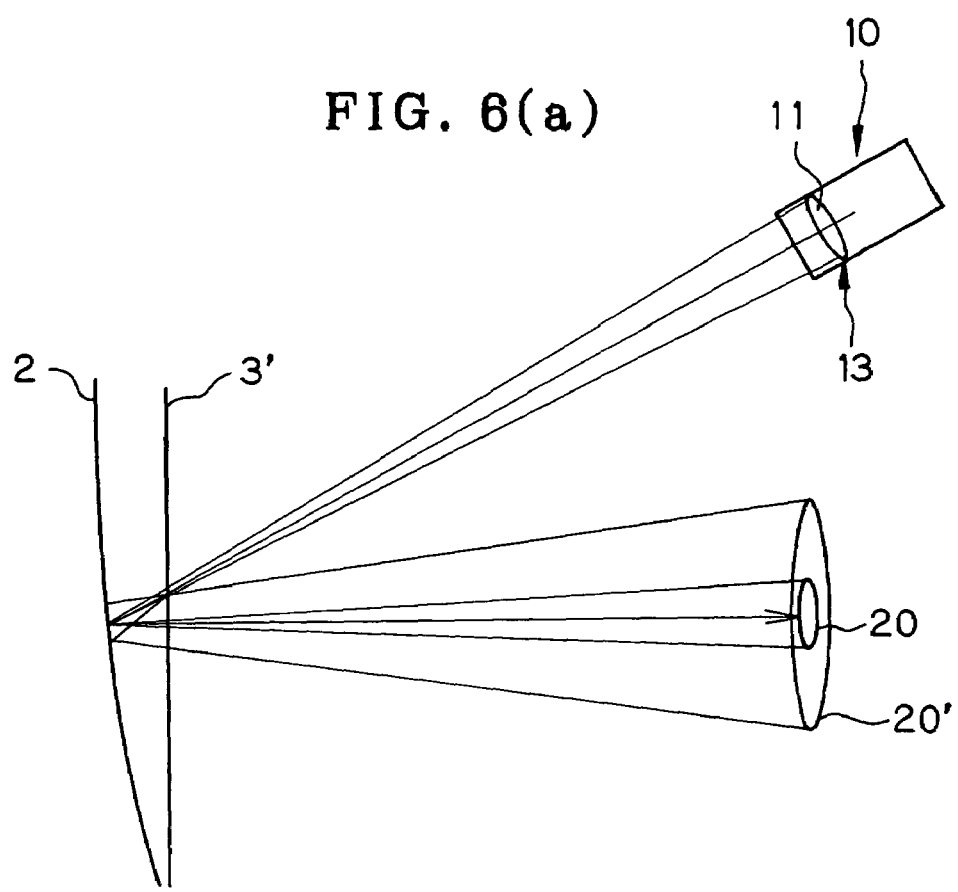
FIGS. 6(a) and 6(b) are a conceptual view of an optical system in a projection type display system incorporating a diffusing plate comprising a transmission hologram and a view of how that projection type display system is set up, respectively.
Figure 6B:
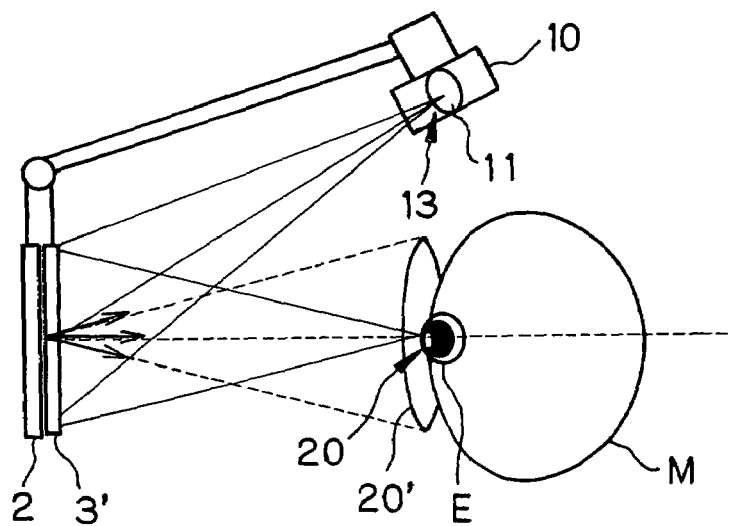

FIG. 6(*a*) is illustrative in conception of an optical system in the projection display system constructed according to the present invention, and FIG. 6(*b*) is illustrative of how that projection display system is set up. In FIG. 6(*a*), a Fresnel concave mirror 2 is shown in the form of a concave mirror, and a display device, an illumination light source, etc. in a projector 10 are not shown. In FIG. 6(*b*), an image appearing on the display device is magnified and projected through a projection optical system 11. A transmission hologram diffusing plate 3' and the Fresnel concave mirror 2 are located in the vicinity of a projected image. The Fresnel concave mirror 2 forms an exit pupil 20 that is an image of a pupil 13 of the projection optical system 11 at a given position that is substantially in line with the eyeball E of a viewer M. The exit pupil image 20 formed through the Fresnel concave mirror 2 in the projection optical system 11 is then magnified to an exit pupil image 20' of easy-to-view size by the diffusing plate 3'. It is thus possible for the viewer M to view the projected image as an image under observation even when the eye E of the viewer M is more or less displaced from the exit pupil image 20. As a result, it is possible to achieve an easy-to-view projection display system wherein an image displayed on the projector 10 can be simultaneously viewed at plural positions, as in FIGS. 1 and 2.

In the present invention, the transmission hologram diffusing plate 3' is located on the entrance side of the Fresnel concave mirror 2, as shown in FIG. 6(a). Accordingly, light rays from the projection optical system 11 to the position of the magnified exit pupil 20' make a total of two roundtrip transmissions through the transmission hologram 3'. This is a feature of the present invention. In other words, the light is diffracted twice through the transmission hologram 3'. On the basis of this, the angle of the first transmission (before incidence on the Fresnel concave mirror 2) of light through the transmission hologram 3' is intentionally allowed to differ from the angle of the second transmission (after incidence on the Fresnel concave mirror 2) of light through the transmission hologram 3', thereby preventing diffraction of light at either one of two such transmissions by the angle selectivity of that hologram. The arrangement for this will be described later.

As is the case with the above diffusing plate 3, the transmission hologram diffusing plate 3' should preferably have an angle of diffusion of up to 20° at full width half maximum for the same reason. Moreover, the diffusibility of the diffusing plate 3' should be such that the angle of diffusion is preferably at least 10° at full width half maximum.

Figure 7A:
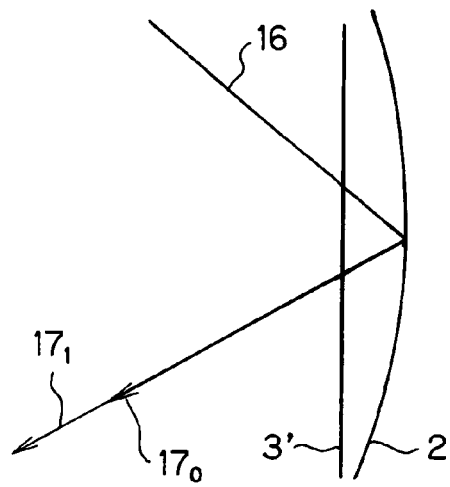
FIGS. 7(a), 7(b) and 7(c) are each an optical path diagram for a Fresnel concave mirror combined with a diffusing plate comprising a transmission hologram, in which light is bent upon the first transmission.

Next, the relation between the bending and the chromatic dispersion of the transmission hologram diffusing plate 3', and the position relation between the Fresnel concave mirror 2 and the transmission hologram diffusing plate 3, is explained. The transmission hologram diffusing plate 3' is fabricated by recording of interferences between reference light and object light from a diffusing light source (secondary light source). Here suppose that reference light and object light are coaxially (in-line) positioned. Then, as shown in FIG. 7(a), an axial chief ray 16 from the projection optical system 11, which is incident on the reflecting surface at or near its center, is first incident on the diffusing plate 3', passing straightforward or without being bent through the diffusing plate 3'. The chief ray passing straightforward through the diffusing plate 3' is reflected at the Fresnel concave mirror 2, turning direction. The reflected chief ray enters the diffusing plate 3' from its back surface, passing straightforward through the diffusing plate 3'. If, in this case, the angle of incidence of the incident light upon the first incidence satisfies the angle of incidence of reconstruction light of the transmission hologram (diffusing plate 3') (the angle at which diffraction efficiency reaches substantially a peak), then diffused light by diffraction is distributed around the chief ray passing straightforward at the first transmission. Upon the second transmission, the diffused light passes substantially straightforward through the diffusing plate. On the other hand, if, upon the second incidence, the angle of incidence of the incident light satisfies the angle of incidence of the reconstruction light, then the axial chief ray 16 passes substantially straightforward or without being diffracted through the diffusing plate upon the first transmission. Upon the second transmission, diffused light by diffraction is distributed around the chief ray passing straightforward through the diffusing plate. In any case, zero-order light $17_0$ and chief ray $17_1$ propagate in the same direction, as shown in FIG. 7(a), in which no diffused light is shown. In FIG. 7(a), only zero-order light $17_0$ not diffracted through the diffusing plate 3' and only chief ray (center ray) $17_1$ in the diffused light by diffraction are shown. In FIG. 7(a), the zero-order light $17_0$ and chief ray $17_1$ propagate in the same direction, arriving at the center of the magnified exit pupil 20'. Therefore, when the diffusing plate 3' has only a diffusing action and has not any optical-path bending action as shown in FIG. 7(a), not only the diffused light but also the zero-order light $17_0$ not diffused by diffraction arrives at the magnified exit pupil 20'. This is not preferable because the spot of zero-order light $17_0$ appears at the center of an image under observation.

Figure 7B:
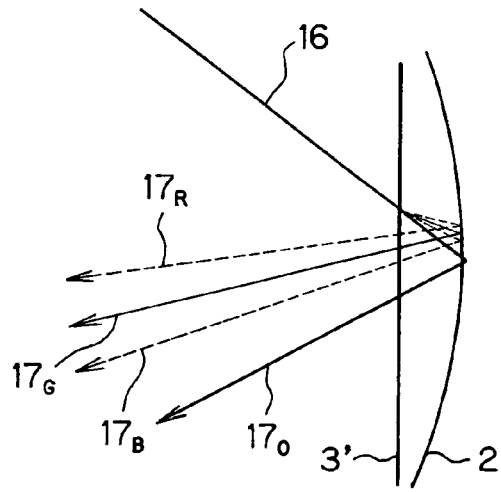
Figure 7C:
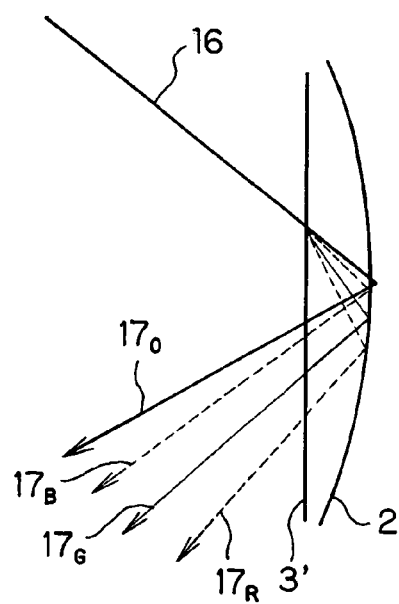
Figure 8A:
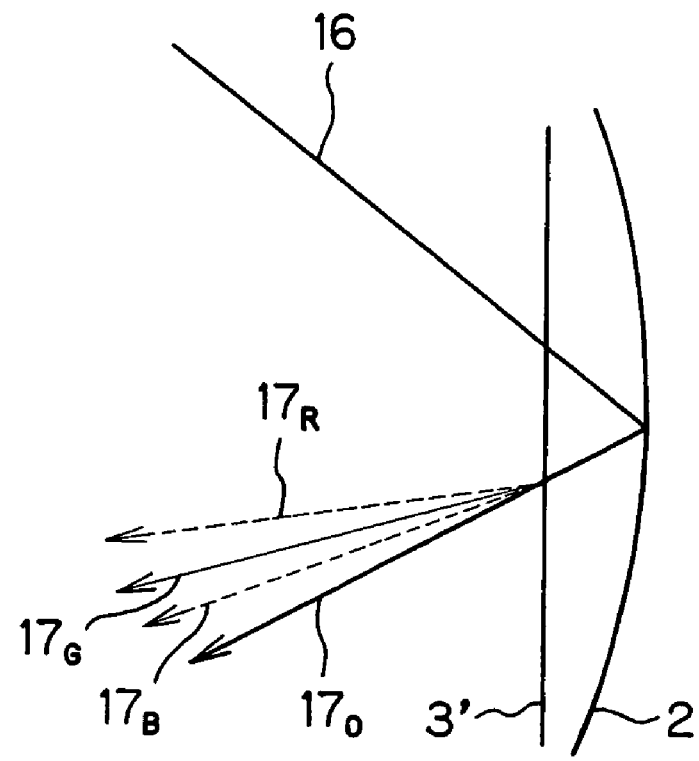
FIGS. 8(a) and 8(b) are each an optical path diagram for a Fresnel concave mirror combined with a diffusing plate comprising a transmission hologram, in which light is bent upon the first transmission.
Figure 8B:
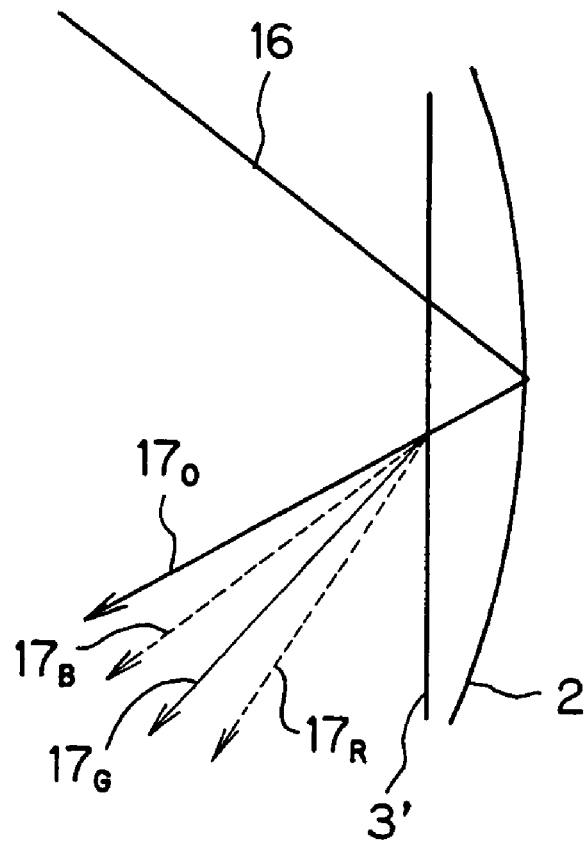

Therefore, a diffusing plate obtained by recording of interferences between reference light and object light in an off-line relation, viz., in a mutually uncoaxial relation is used as the transmission hologram diffusing plate 3'. When light that satisfies the angle of incidence of reconstruction light is diffracted through the diffusing plate 3' obtained in such an off-line relation, the bending of light rays occurs with chromatic dispersion. Such optical paths as shown in FIGS. 7(b) and 7(c) and such optical paths as shown in FIGS. 8(a) and 8(b) are taken depending on the direction of that bending. However, it is noted that in FIGS. 7(b) and 7(c), the condition regarding the angle of incidence of reconstruction light for the diffusing plate 3' is satisfied upon the first incidence, and in FIGS. 8(a) and 8(b), that condition is satisfied upon the second incidence. In FIG. 7(b) and FIG. 8(a), the direction of bending of light through the diffusing plate 3' is such that the angle of diffraction becomes small with respect to the angle of incidence to normal, and in FIG. 7(c) and FIG. 8(b), that direction is such that the angle of diffraction becomes large with respect to the angle of incidence. In these figures, no diffused light is shown. Chief rays (center rays) of R, G and B wavelengths diffracted and bent through the diffusing plate 3' are indicated by $17_R$, $17_G$ and $17_B$. As can be seen from FIGS. 13 and 14, when a transmission hologram having an action on bending of light rays is used as the diffusing plate 3', zero-order light $17_0$ not diffracted through the hologram can then be separated from diffracted light $17_R$, $17_G$ and $17_B$, thereby ensuring that the zero-order light be not incident on the magnified exit pupil 20'. Specifically, it is desired that the zero-order light $17_0$ be incident on a position away from the center of the magnified exit pupil 20' by at least ½ of the magnified pupil diameter.

Here, the angle of bending (deflection) of light through the transmission hologram is defined by the absolute value γ of a difference between the angle of incidence and the angle of diffraction, as measured at a d-line (of 587.6 nm wavelength). As the angle of bending γ is too small, the zero-order light is entered in the image under observation, as described above. Conversely, as the angle of bending is too large, chromatic dispersion becomes too large. As a result, the range where three R, G and B wavelengths are put one upon another at the magnified exit pupil 20', i.e., the exit pupil range where images can be viewed with good chromatic reproducibility becomes too narrow.

Accordingly, the angle of bending (deflection) γ at d-line through the transmission hologram diffusing plate 3' should preferably satisfy the following condition.

$$\gamma > 1° \tag{1}$$

More preferably, $$\gamma>2° \quad (1\text{-}1)$$

Even more preferably, $$\gamma>10° \quad (1\text{-}2)$$

On the other hand, it is also preferable to satisfy the following condition:

$$\gamma<45° \quad (2)$$

More preferably, $$\gamma<20° \quad (2\text{-}1)$$

A combination of conditions (1-2) and (2-1) results in the following condition (3):

$$10°<\gamma<20° \quad (3)$$

Condition (3) is now explained. As the lower limit of 10° to this condition is not reached, zero-order light is less separable from normal viewing light that enables a display image to be viewed, and so even with a slight movement of the viewer's head, glaring zero-order light often enters the viewer's eye. As the upper limit of 20° to condition (3) is exceeded, chromatic dispersion due to the transmission hologram 3' becomes more noticeable, resulting in a decrease in the range of view.

Here let R be light of 700-nm wavelength and B be light of 400-nm wavelength. Then, the difference in the angle of diffraction between diffracted light rays $17_R$ and $17_B$ should preferably be reduced as much as possible. Specifically, that difference should preferably be up to 18°. This is necessary to prevent the exit pupil range where images can be viewed with good reproducibility from becoming too narrow, as described above. Again let R be light of 700-nm wavelength and B be light of 400-nm wavelength. At the position of the magnified exit pupil 20', the difference in the entrance position between diffracted light rays $17_R$ and $17_B$ should preferably be reduced as much as possible. Specifically, that difference should preferably be up to ½ of the diameter of the magnified exit pupil 20'.

In FIGS. 7 and 8, the axial chief ray 16 from the projection optical system 11 or the zero-order light $17_0$ is assumed to be obliquely incident on the Fresnel concave mirror 2 (at an angle β with respect to normal at the entrance position of the Fresnel concave mirror 2). Suppose here that the axial chief rays 16 or the zero-order light $17_0$ is incident at substantial right angles (β≈0°) on the mirror surface of the Fresnel concave mirror 2. Then, the chief light rays $17_R$, $17_G$ and $17_B$ leaving the hologram after passed twice through the diffusing plate 3' travel in a substantially opposite direction to the axial chief ray 16. This results in interference of the position of the magnified exit pupil 20' with the projection optical system 11. Accordingly, the angle of incidence β of the axial chief ray 16 from the projection optical system 11 or the zero-order light $17_0$ on the mirror surface of the Fresnel concave mirror 2 should preferably satisfy the following condition.

$$0°<\beta<45° \quad (4)$$

More preferably, $$5°<\beta<20° \quad (4\text{-}1)$$

This condition (4-1) is now explained. As the lower limit of 5° to this condition is not reached, the amount of decentration of the Fresnel concave mirror 2 becomes small. This in turn causes conjugative reconstruction to occur at the diffusing plate 3', resulting in a decrease in the quantity of light available for viewing displayed images. As the upper limit of 20° to condition (4-1) is exceeded, the amount of decentration of the Fresnel concave mirror 2 becomes too large. This in turn renders the pupil aberrations to be projected large, leading to difficulties in viewing an image of uniform brightness.

Figure 9A:
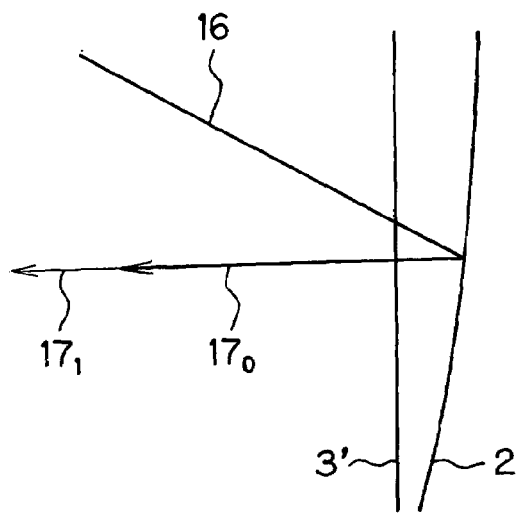
FIGS. 9(a), 9(b) and 9(c) are each an optical path diagram for a decentered Fresnel concave mirror combined with a diffusing plate comprising a transmission hologram, in which light is bent upon the first transmission.
Figure 9B:
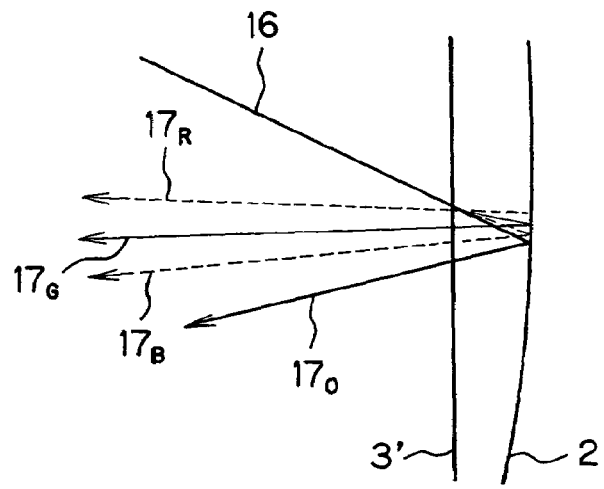
Figure 9C:
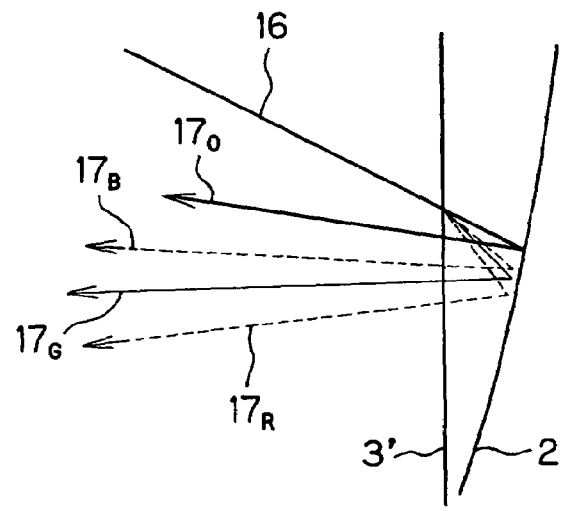

In FIGS. 7 and 8, the axial chief ray 16 from the projection optical system 11 is assumed to be incident on substantial centers of the transmission hologram diffusing plate 3' and the Fresnel concave mirror 2 on the back surface side thereof, and there is assumed to be no decentration between the diffusing plate 3' and the Fresnel concave mirror 2. As can be seen from FIGS. 7 and 8, the chief rays $17_R$, $17_G$ and $17_B$ transmitting twice through the diffusing plate 3' are at angles with respect to the diffusing plate 3', and the magnified exit pupil 20' is not positioned on the front of the hologram diffusing plate 3'. Accordingly, the viewer would view images projected from an oblique direction; the image under observation would become a tilted image leading to an image distortion. To avoid this, the Fresnel concave mirror 2 is decentered (e.g., upward) with respect to the diffusing plate 3', as shown in FIGS. 9(a), 9(b) and 9(c), so that the chief rays $17_R$, $17_G$ and $17_B$ reflected at the Fresnel concave mirror 2 are at substantially right angles with the diffusing plate 3' after the second transmission through the diffusing plate 3'. It is noted that FIGS. 9(a), 9(b) and 9(c) correspond to FIGS. 7(a), 7(b) and 7(c), respectively.

It should be understood that since the projected image is projected from the projection optical system 11 obliquely onto the diffusing plate 3', the projected image on the hologram diffusing plate 3', too, becomes a tilted image leading to an image distortion. It is thus preferable to use an optical system having a function of correcting such a tilted image leading to an image distortion as the projection optical system 11.

The magnified exit pupil 20' is positioned on the front of the diffusing plate 3' (in an actual application where a plurality of magnified exit pupils 20' are formed as in FIGS. 1 and 2, the front of the side view), and the axial chief ray 16 from the projection optical system 11 or the zero-order light $17_0$ is allowed to be obliquely incident on the Fresnel concave mirror 2, so that surface specular light providing noise light can be prevented from entering the magnified exit pupil 20' of the viewing system.

The ratio γ/β between the above angle of bending (deflection) γ and the angle of incidence β of light on the Fresnel concave surface 2 should preferably satisfy the following condition.

$$0.01<\gamma/\beta<1{,}000 \quad (5)$$

More preferably, $$0.5<\gamma/\beta<2 \quad (5\text{-}1)$$

Condition (5-1) is now explained. As the lower limit of 0.5 to this condition is not reached, the angle of bending of light through the transmission hologram 3' becomes small. As a consequence, zero-order light not diffracted through the transmission hologram 3' would enter the magnified exit pupil 20', leaving spot flares on an image under observation. As the upper limit of 2 is exceeded, the amount of decentration of the Fresnel concave mirror 2 becomes relatively small. In this case, there is a light ray that is reflected at the Fresnel concave mirror 2 upon incidence on the transmission hologram 3', then subjected to only slight Fresnel reflection at the back surface of the transmission hologram 3', and again reflected at the Fresnel concave mirror 2. This light ray, too, is not preferable because it would be viewed as spot flares upon incidence on the magnified exit pupil 20'.

Even more preferably in consideration of spot flares, $$0.5 < \gamma/\beta < 2 \qquad (5\text{-}1)$$

When the transmission hologram diffusing plate 3' is used, it is desired to use LEDs or LDs of high monochromaticity for light sources for illuminating the display devices in the projector 10, preferably in combination with three RGB colors.

Next, Example 1 of the combined projection screen 1 comprising the Fresnel concave mirrors 2L, 2R for the magnification and projection of the exit pupil 13 of the projection optical system 11 and the transmission hologram diffusing plate 3' is now explained. In this example, ray tracing is carried out in the form of normal ray tracing from the center of the exit pupil 13 of the projection optical system 11 to the magnified exit pupils 20L', 20R' while the exit pupil 13 of the projection optical system 11 is defined as an object plane and the magnified exit pupils 20L', 20R' as an image plane.

EXAMPLE 1

Figure 10:
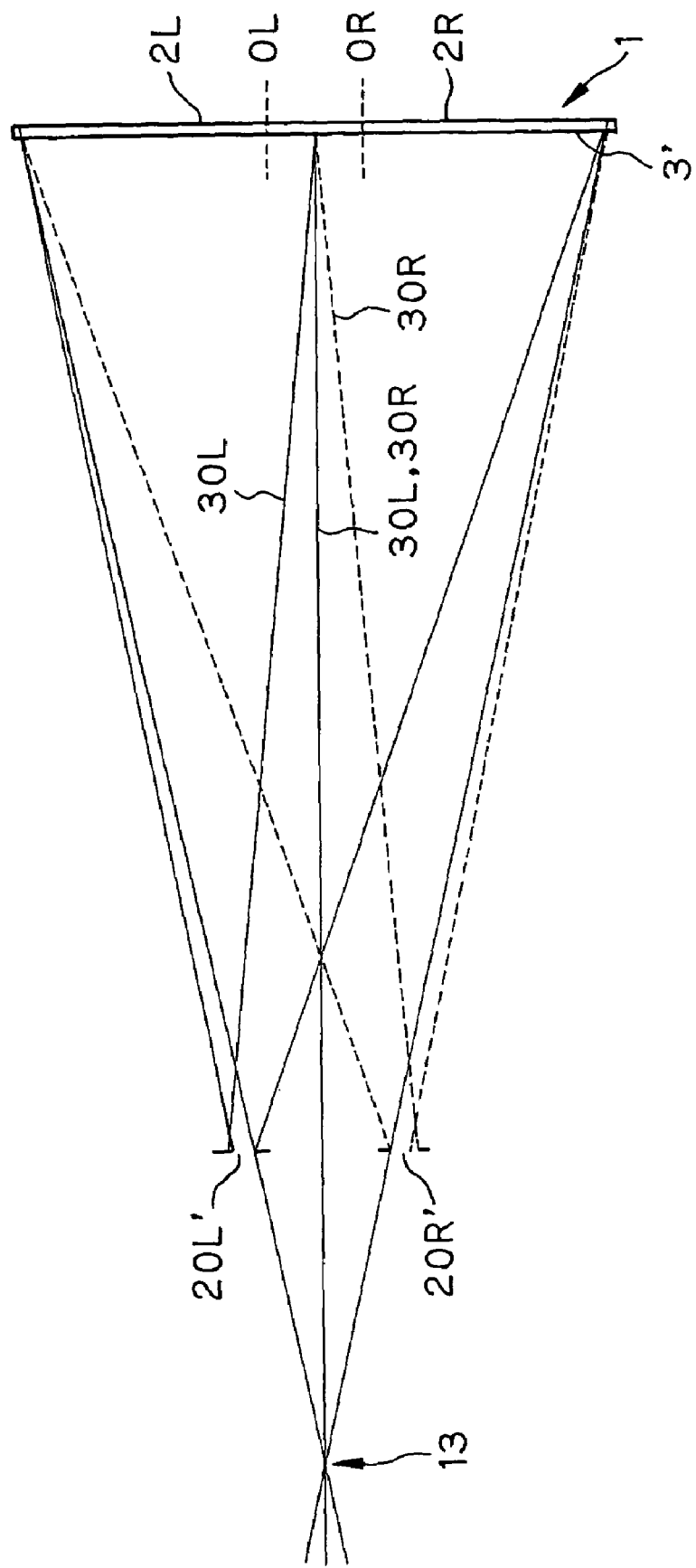
FIG. 10 is an optical path diagram for Example 1 of the invention upon projection onto the X-Z plane.
Figure 11:
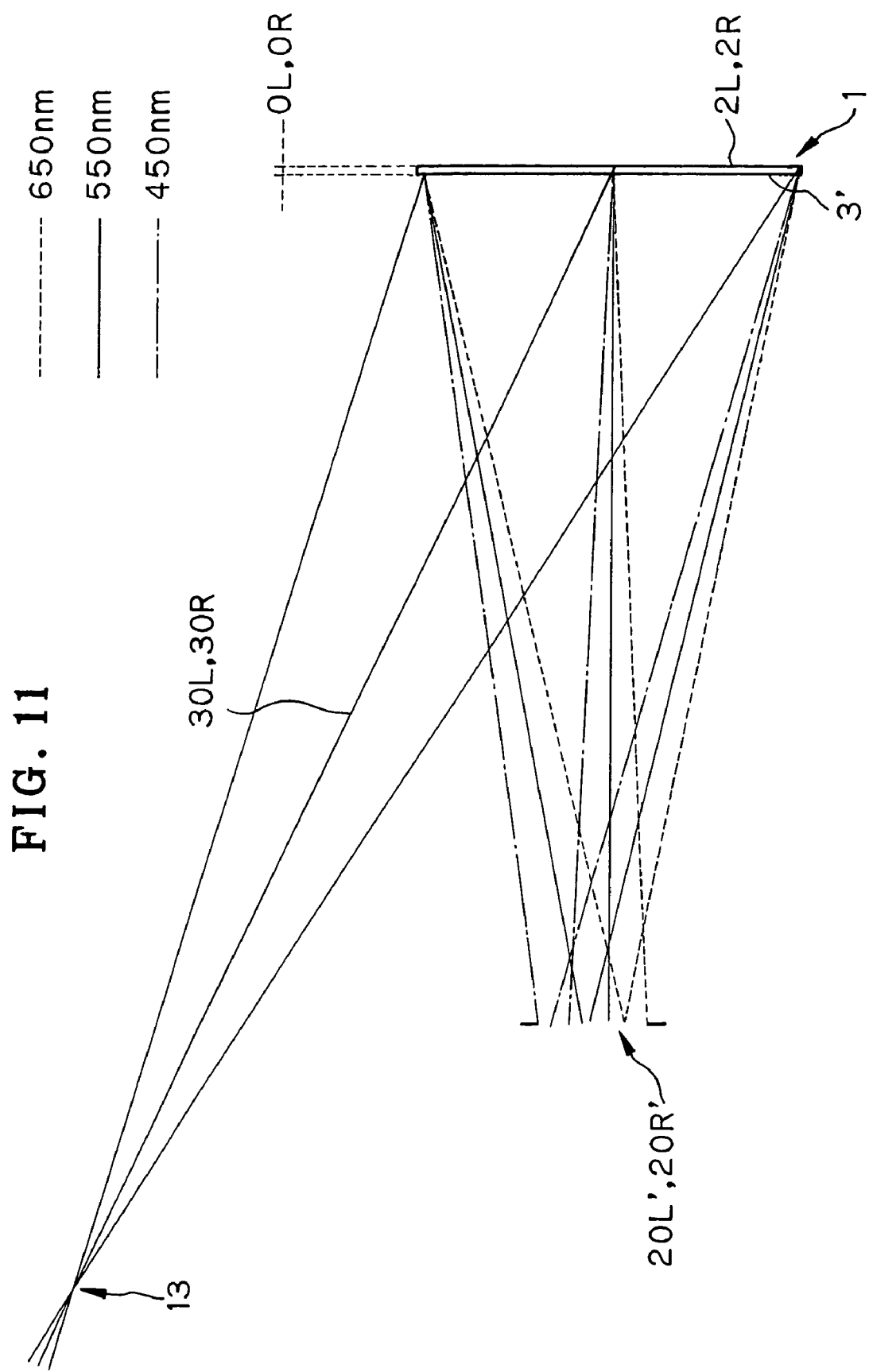
FIG. 11 is an optical path diagram for Example 1 of the invention upon projection onto the Y-Z plane.

FIG. 10 is an optical path diagram for Example 1 upon projection onto the X-Z plane, and FIG. 11 is an optical path diagram for Example 1 upon projection onto the Y-Z plane. FIG. 12 is illustrative of how a transmission hologram used for the diffusing plate 3' in this example is photo-recorded. FIG. 13 is illustrative of to what degree exit pupil images at 450-nm, 550-nm and 650-nm wavelengths overlap at the position of a magnified exit pupil 20L' (20R') in this example as well as the positions of incidence of zero-order light and surface reflected light. In FIGS. 12 and 13, the numeral values are given in mm.

In Example 1 corresponding to FIG. 7(c) (FIG. 9(c)), the condition regarding the angle of incidence of reconstruction light is satisfied upon the first incidence, and no diffraction occurs upon the second incidence. The direction of bending of light through the diffusing plate 3' is such that the angle of diffraction becomes large with respect to the angle of incidence to normal. A Fresnel concave mirror 2L, 2R is made up of a Fresnel back-surface mirror. Here let MX and MY represent the amount of decentration of the Fresnel back-surface mirror in its X and Y directions, γ represent the angle of deflection of an axial chief ray 30 (30L, 30R) through the transmission hologram 3', and β represent the angle of incidence of light on the mirror surface of the Fresnel concave mirror 2L, 2R. Then, MX=20 mm (for the Fresnel concave mirror 2L), −20 mm (for the Fresnel concave mirror 2R), MY=157.23 mm, γ=15.00° (in a vitreous material having a refractive index of 1.4924), and β=12.57° (in a vitreous material having a refractive index of 1.4924).

Figure 12A:
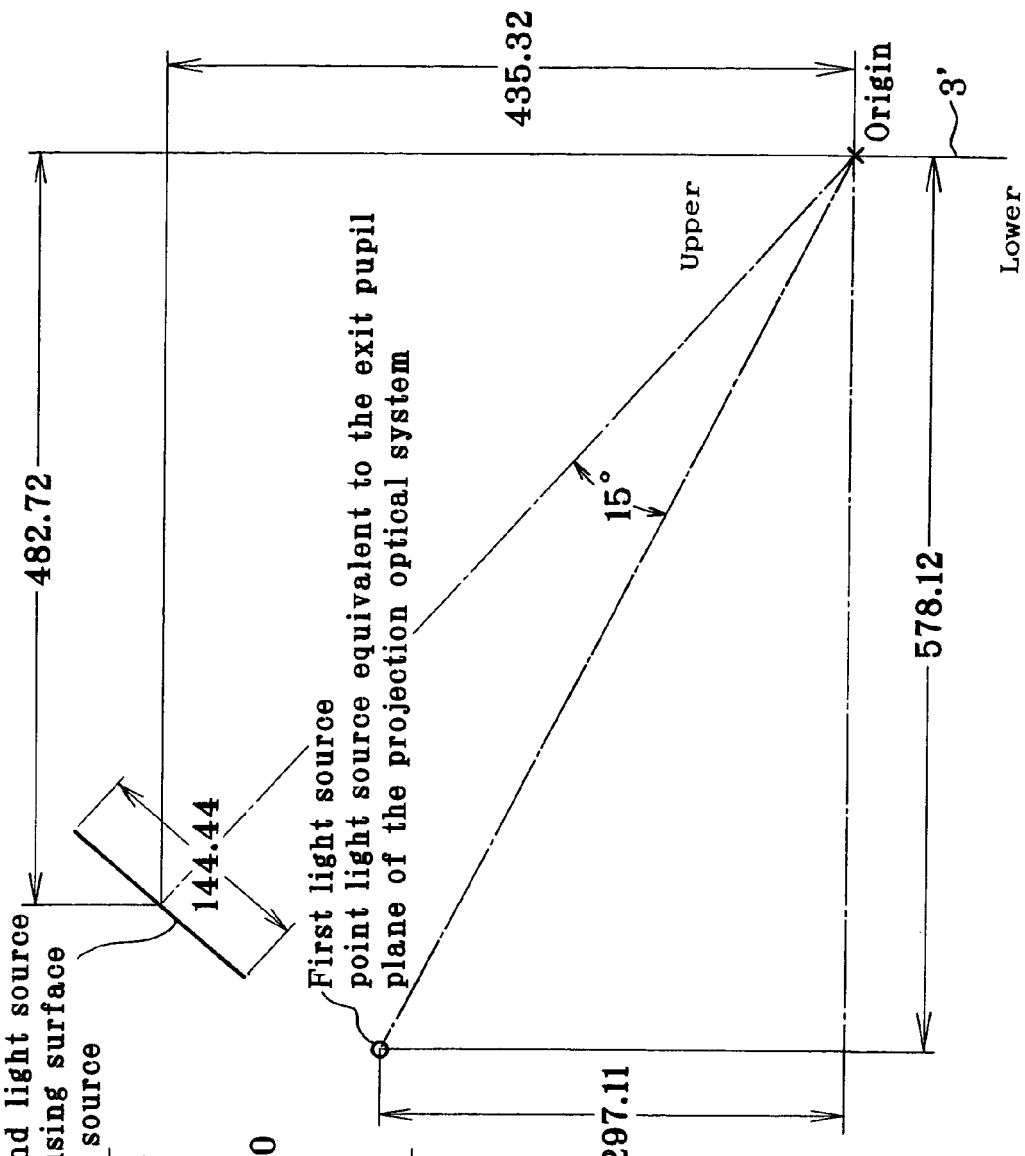
FIG. 12 is illustrative of how to fabricate a transmission hologram used as the diffusing plate in Example 1 of the invention.
Figure 12B:
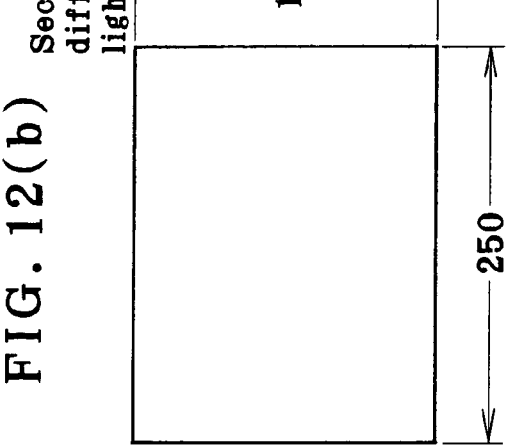
Figure 13:
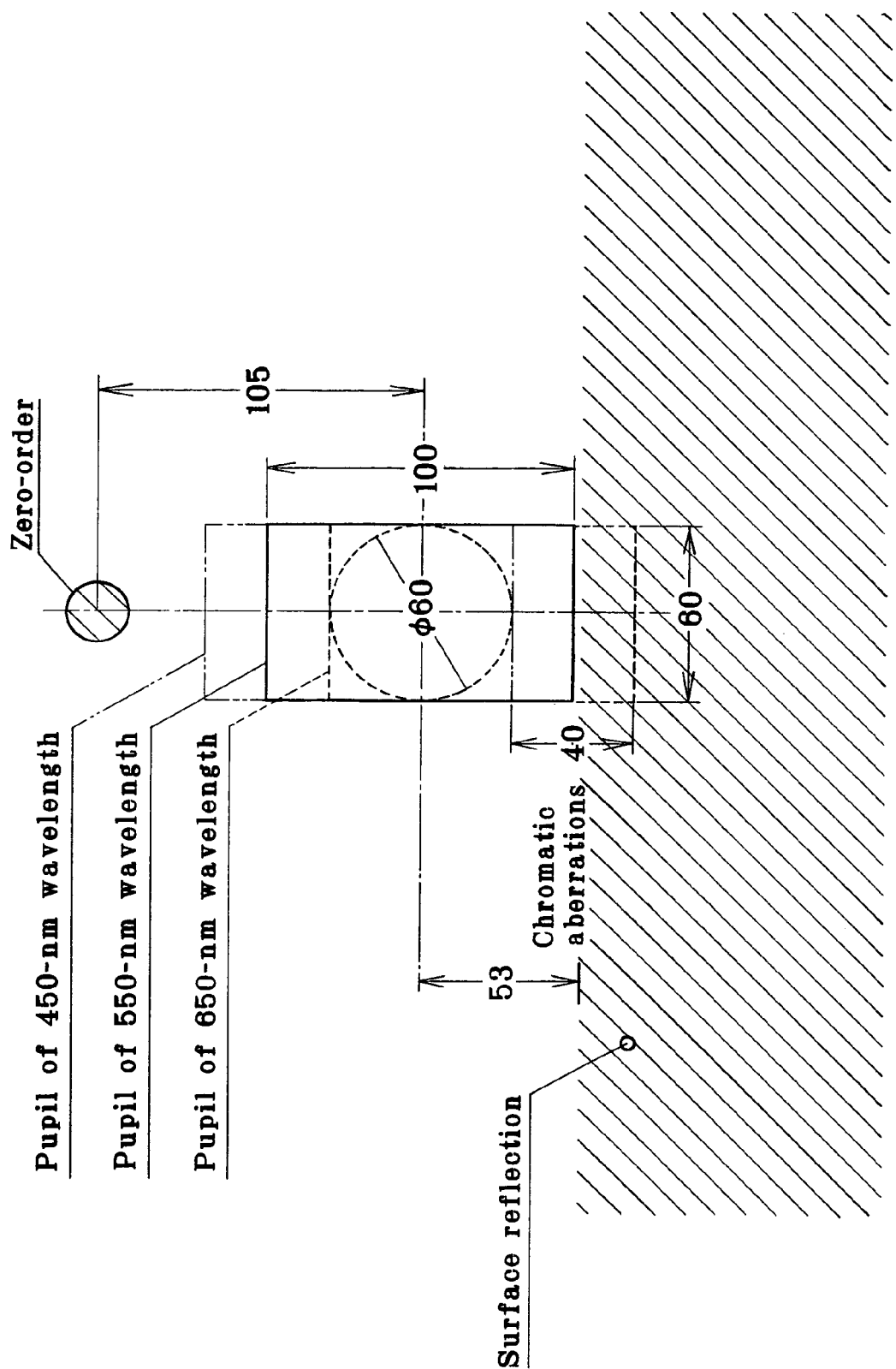
FIG. 13 is illustrative of to what degree RGB exit pupil images overlap at the position of the exit pupil of Example 1 of the invention and the positions of incidence of zero-order light and surface reflected light.

Exposure conditions for the transmisstion hologram 3' in this example are illustrated in FIG. 12(a), wherein the origin is defined by the point of incidence of the axial chief ray 30 (30L, 30R) on the surface of the transmission hologram 3'. Referring here to a coordinate system for exposure, a hologram surface is defined by the X-Y plane and the Z-axis is defined by a direction going away from the exit pupil 13 of a projection optical system 11. Hologram size is 190 mm×250 mm, as shown in FIG. 12(b). The first light source position (X1, Y1, Z1) for exposure is determined as follows, provided that the light source is given by a point light source.

(X1, Y1, Z1)=(0, 297.11, −578.12)

Figure 12C:
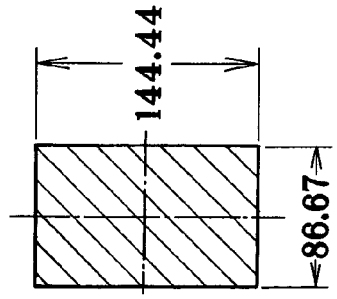

The second light source position (X2, Y2, Z2) is determined as follows, provided that the second light source is given by a diffusing surface light source having an area of 144.44 mm×86.67 mm, as shown in FIG. 12(c).

(X2, Y2, Z2)=(0, 435.32, −482.72)

The transmission hologram fabricated under the above exposure conditions is used as the diffusing plate 3'. A light beam diffused through the diffusing plate 3' is reflected at the Fresnel concave mirrors 2L, 2R to form magnified pupils 20L', 20R' having a square exit pupil range of 60 mm×60 mm ensuring observation with good chromatic reproducibility on the pupil plane of the viewer and an X-direction amount of decentration PX, given below, as can be seen from FIG. 13 showing one magnified exit pupil. In that range, a circular pupil of φ60 can be created. In this example, pupil chromatic aberration (a difference between the exit pupil image of 450-nm wavelength and the exit pupil image of 650-nm wavelength) is 40 mm.

PX=34.87 mm (magnified exit pupil 20L'), −34.87 mm (magnified-exit pupil 20R')

Construction parameters in Example 1 are set out below. In Example 1, the axial chief ray 30L, 30R is defined by a light ray that leaves the center of the pupil 13 of the projection optical system 11 and arrives at the center of the magnified exit pupil 20L', 20R' through the center of the diffusing plate 3' comprising a transmission hologram, as described above.

In Example 1, normal ray tracing is carried out on condition that the origin is defined by the center of the pupil 13 of the projection optical system 11, the pupil plane is defined by the X-Y plane, the X-axis direction is defined by a direction of connecting the centers OL, OR of the Fresnel concave mirrors 2L, 2R, the X-axis positive direction is defined by an OR to OL direction, and the Z-axis positive direction is defined by the direction of propagation of the axial chief rays 30L, 30R vertical to the pupil.

For the decentered surface, there are given the amount of decentration of its apex from the origin of the optical system and the angles of inclination of its center axis around the X-, Y- and Z-axes (α, β, γ(°)). Here the amounts of decentration in the X-, Y- and Z-axis directions are referred to as X, Y and Z, and the center axis is defined by the Z-axis of formula (a), given below, for an aspheric surface. In that case, the positive for α and β means counterclockwise rotation with respect to the positive direction of the respective axes, and the positive for γ means clockwise rotation with respect to the positive direction of the Z-axis. For α, β and γ rotation of the center axis of the surface, the center axis of the surface and its XYZ orthogonal coordinate system are first counterclockwise rotated around the X-axis by α. Then, the center axis of the rotated surface is counterclockwise rotated around the Y-axis of a new coordinate system by β while the once rotated coordinate system is counterclockwise rotated around the Y-axis by β. Then, the center axis of the twice rotated surface is clockwise rotated around the Z-axis of a new coordinate system by γ.

The surface shape of the aspheric surface used herein is a rotationally symmetric aspheric surface defined by the following defining formula:

$$Z = (Y^2/R)/[1+\{1-(1+K)Y^2/R^2\}^{1/2}] + AY^4 + BY^6 + CY^8 + DY^{10} + \qquad (a)$$

where Z is an optical axis (axial chief ray) provided that the direction of propagation of light is positive, and Y is in the direction vertical to the optical axis. Here R is a paraxial radius of curvature, K is a conical constant, and A, B, C, D, ... are the 4th, 6th, 8th and 10th aspheric coefficients. The Z-axis in this defining formula provides the axis of the rotationally symmetric aspheric surface.

It is noted that the term regarding aspheric surfaces on which no data are given is zero. Refractive indexes are given on a d-line basis (587.56 nm). Length is given in mm.

Construction parameters for Example 1 are set out below. In what follows, "ASS", "FL", "RE", "HOE" and "PIM" represent an aspheric surface, a Fresnel surface, a reflecting surface, a transmission hologram and an image projection surface, respectively.

EXAMPLE 1

| Surface No. | Radius of curvature | Surface separation | Displacement and tilt | Refractive index | Abbe's No. |
|---|---|---|---|---|---|
| Object plane | ∞ | | | | |
| 1 | HOE | | (1) | 1.4924 | 57.6 |
| 2 | ∞ (PIM) | | (1) | 1.4924 | 57.6 |
| 3 | ASS(1) (RE, FL) | | (2) | 1.4924 | 57.6 |
| 4 | ∞ | | (1) | | |
| Image plane | ∞ | | (3) | | |

ASS(1)

| | |
|---|---|
| R | −407.45 |
| K | −5.8103 × 10 |
| A | −7.5130 × 10$^{-7}$ |
| B | 7.5802 × 10$^{-12}$ |
| C | −3.1478 × 10$^{-17}$ |

Displacement and tilt(1)

| X | 0.00 | Y | 0.00 | Z | 650.00 |
|---|---|---|---|---|---|
| α | 25.00 | β | 0.00 | γ | 0.00 |

Displacement and tilt(2)

| X | MX | Y | MY | Z | 577.79 |
|---|---|---|---|---|---|
| α | 25.00 | β | 0.00 | γ | 0.00 |

Displacment and tilt(3)

| X | PX | Y | −190.18 | Z | 242.16 |
|---|---|---|---|---|---|
| α | 25.00 | β | 0.00 | γ | 0.00 |

Figure 14:
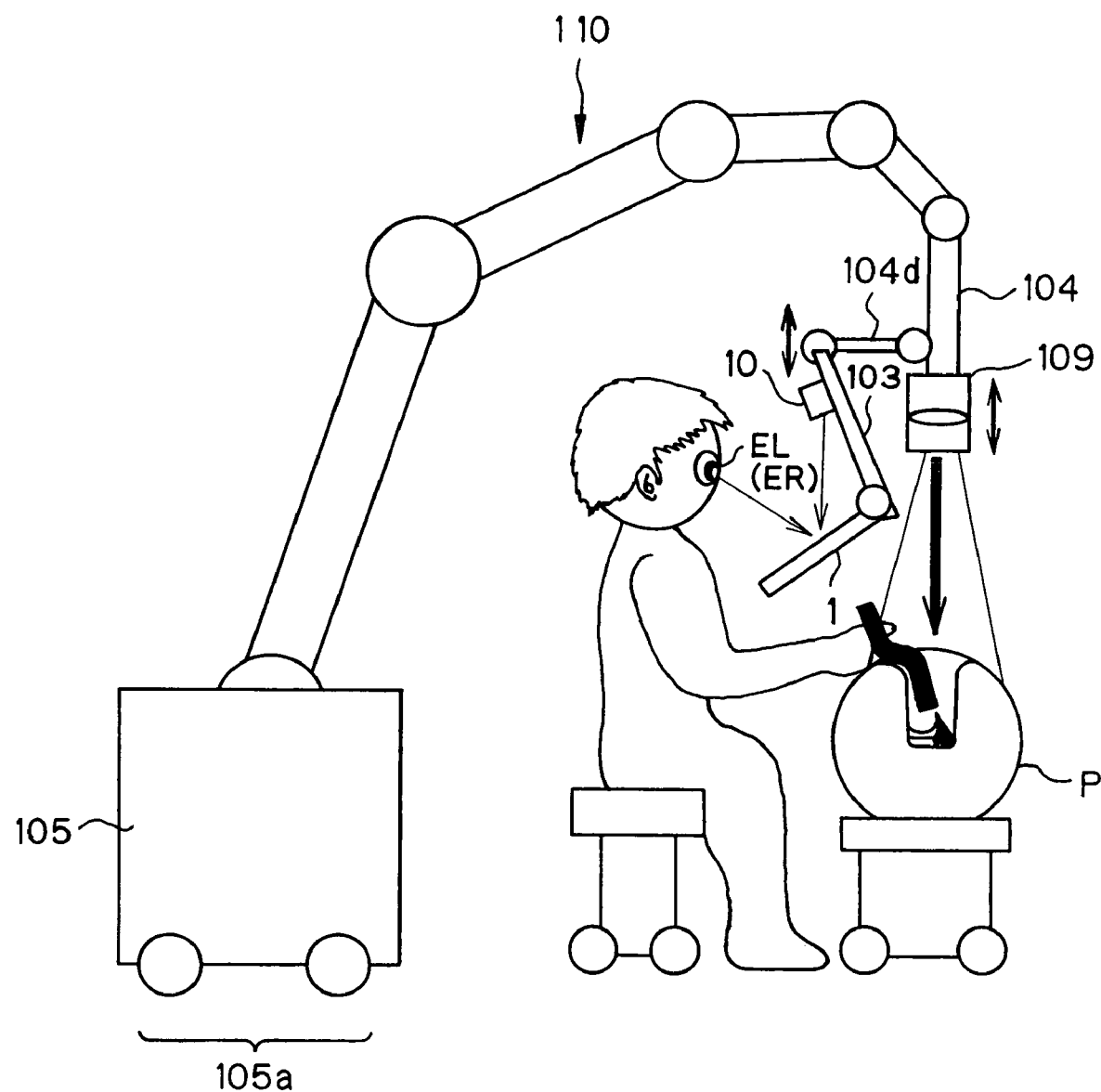
FIG. 14 is illustrative of one specific embodiment of a surgical 3D viewing system that incorporates the projection screen and projection type display system of the invention.

It is here understood that the projection screen and projection type display system according to the invention as described above, for instance, may be used with such a surgical 3D viewing system as shown in FIG. 14. FIG. 14 is illustrative of one embodiment of this surgical 3D viewing system, wherein a support body 105 having a caster 105a is connected with a universal arm 110, which is in turn connected with a support arm 104. Three-dimensionally movable and 360° rotatable, the support arm 104 is provided with a holder member 103 via a joint 104d. This holder member 103 that is also adapted to be movable and rotatable is provided with a projector 10 and a screen 1 according to the invention.

On the other hand, the support arm 104 is provided at its end with an image input device 109 in a surgical microscope. The image input device 109 has a built-in camera to take images of an affected part in a patient P. The images are sent as input images to the projection type display system, more particularly, the projector 10.

The thus constructed FIG. 14 system ensures that while the images of the affected part in the patient P are viewed with both eyes EL and ER under the surgical microscope, operation can be performed.

Figure 15:
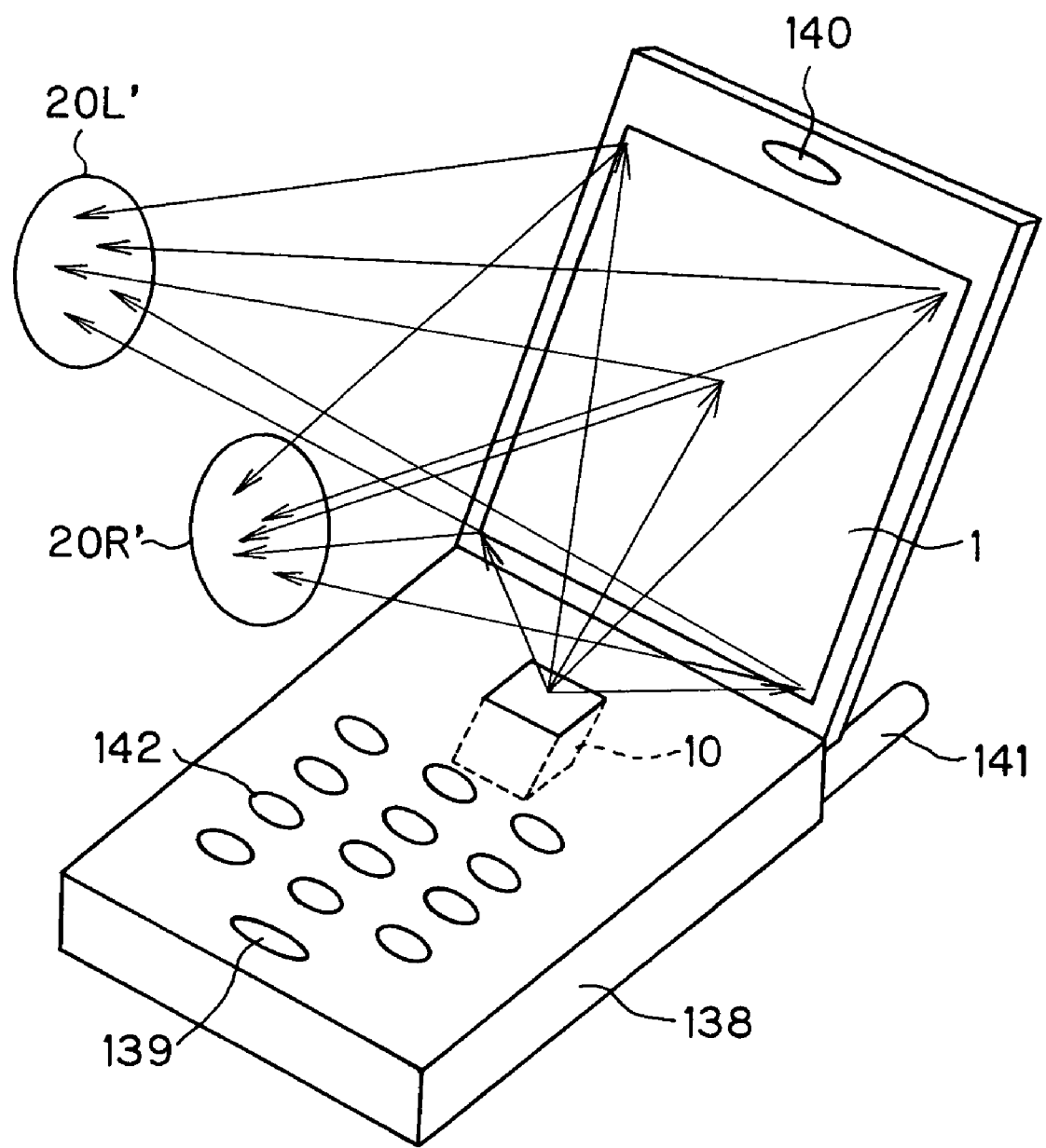
FIG. 15 is illustrative of one specific embodiment of a cellular phone that is the projection type display system of the invention.
Figure 16:
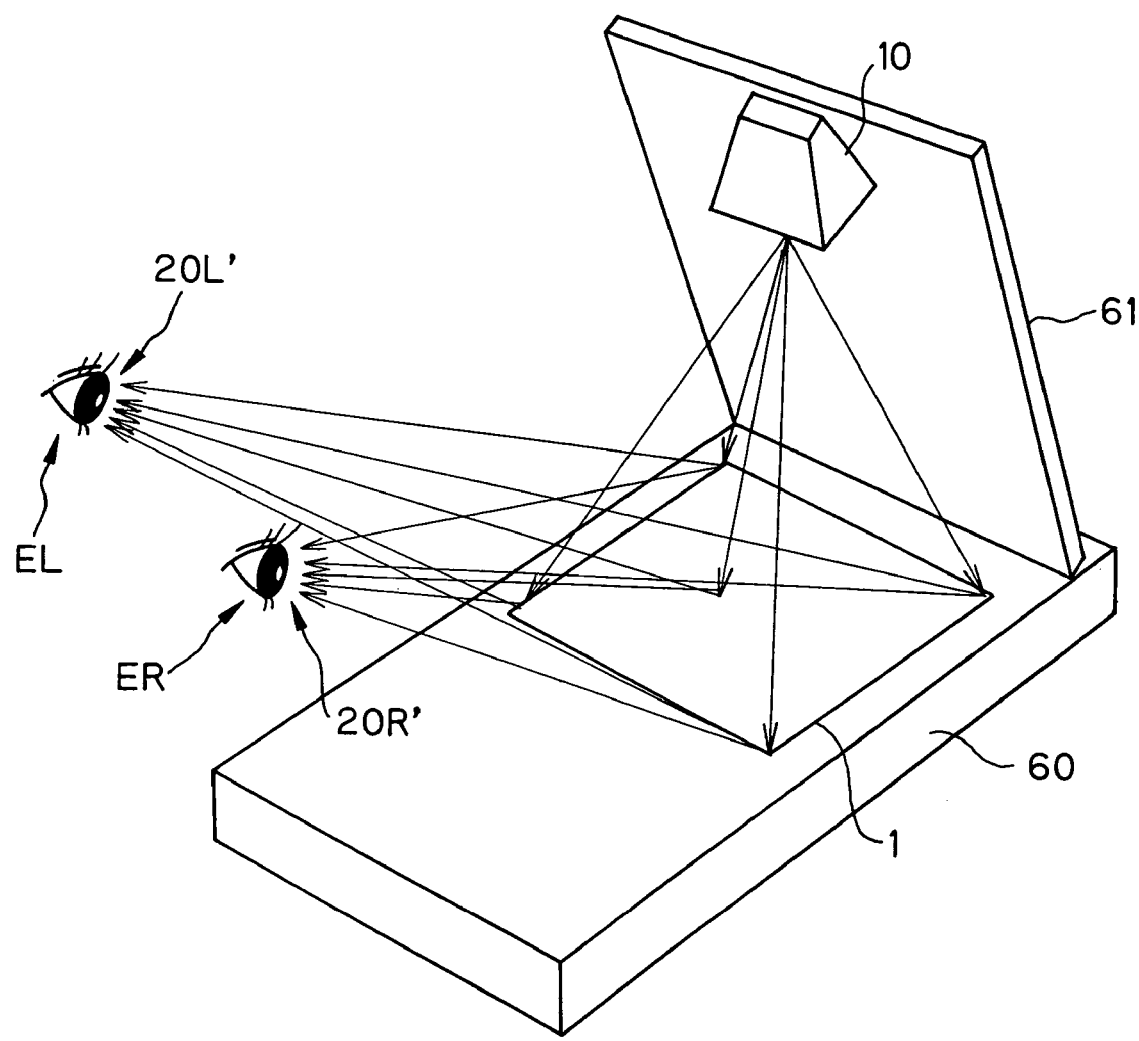
FIG. 16 is illustrative of one specific embodiment of a hand-holdable viewer type that is the projection type display system of the invention.

The projection screen and projection type display system according to the invention may also be used with information processors in general, and a convenient-to-carry cellular phone in particular. FIG. 15 is illustrative of one embodiment of such a projection type display system, in particular, a cellular phone.

The cellular phone indicated generally at 138 comprises a microphone 139, a speaker 140, an antenna 141, a button 142, and the projection viewing system according to the invention. The microphone 139 is to enter the voice of an operator as information, and the speaker 140 is to produce the voice of a person at the other end. The antenna 141 is to transmit and receive communications waves, and the button 142 is used for the operator to enter information in the cellular phone.

The projection screen and projection type display system according to the invention are used to project and display the images taken of the operator, a person at the other end, etc. as well as information such as telephone numbers. A projector 10 and a screen 1 according to the invention are so located that displayed images can be reasonably viewed with both eyes at the positions of magnified exit pupils 20L', 20R'.

Further, the projection screen and projection type display system according to the invention may be applied to such a hand-holdable viewer type device as shown in FIG. 17, to say nothing of the above portable type device. For instance, a projector 10 could be foldably attached to the body of a projection type display system such that a support member 61 of the projector 10 serves as a protective cover for a projection screen 1 according to the invention, thereby improving dustproof capability.

While the projection screen and projection type display system according to the invention have been described in conjunction with some embodiments, it is understood that the invention is by no means limited thereto and so many modifications could be made thereto.

I claim:

1. A projection screen used for a projection optical system, comprising a substrate wherein a plurality of Fresnel surfaces are formed superposed on the same surface so that the plurality of Fresnel surfaces are mutually decentered and at least partially superposed on each other, wherein the plurality of Fresnel surfaces are capable of projecting the same pupil of the projection optical system onto exit pupils different each other.

2. The projection screen according to claim 1, wherein each Fresnel surface is a reflecting surface having positive power.

3. The projection screen according to claim 1, wherein each Fresnel surface is a transmitting surface having positive power, behind which a reflecting surface is located.

4. The projection screen according to claim 1, wherein each Fresnel surface is a transmitting surface having positive power.

5. The projection screen according to claim 2, wherein a plurality of pyramidal projections are provided on the surface on which the plurality of Fresnel surfaces are formed; and at least a part of the projections having at least two optically active facets and at least two optically inactive facets, respectively.

6. The projection screen according to claim 2, wherein a plurality of pyramidal pits are provided on the surface on which the plurality of Fresnel surfaces are formed; and at least a part of the pits having at least two optically active facets and at least two optically inactive facets, respectively.

7. The projection screen according to claim 1, wherein a diffusing plate is located on a side of said projection screen on which projection light is to be incident, or at which projection light is to be reflected.

8. The projection screen according to claim 7, wherein said diffusing plate is a diffusing plate comprising a minute projection-and-pit or roughened surface having diffusibility plus directivity.

9. The projection screen according to claim 7, wherein said diffusing plate has an angle of diffusion of up to 20° at full width half maximum.

10. A projection type display system comprising a display device for displaying, an image, a projection optical system for magnifying and projecting an image displayed on said display device, and a projection screen located near an image projected through said projection optical system, wherein said projection screen comprises a projection screen as recited in claim 1.

11. A projection screen comprising:
a substrate where a plurality of Fresnel surfaces are superposed on the same surface thereof in mutually decentered fashion; and
a diffusing plate comprising a transmission hologram located on a side of said projection screen on which projection light is to be incident, or at which projection light is reflected.

12. The projection screen according to claim 11, which is constructed such that zero-order light that is not diffracted upon first and second transmissions of light through said transmission hologram is prevented from forming an image at a plurality of Fresnel surfaces, entering a magnified exit pupil magnified through said transmission hologram.

13. The projection screen according to claim 12, which is constructed such that zero-order light that is not diffracted upon the first and second transmissions of light through said transmission hologram is incident on said magnified exit pupil at a distance of at least ½ of a pupil diameter from a center of said magnified exit pupil.

14. The projection screen according to claim 12, wherein said diffusing plate comprising a transmission hologram has a bending action by diffraction.

15. The projection screen according to claim 14, which satisfies the following condition:

$$\gamma > 1° \tag{1}$$

where $\gamma$ is an angle of bending of a d-line axial chief ray by said transmission hologram.

16. The projection screen according to claim 14, which satisfies the following condition:

$$\gamma < 45° \tag{2}$$

where $\gamma\gamma$ is an angle of bending of a d-line axial chief ray by said transmission hologram.

17. The projection screen according to claim 14, which satisfies the following condition:

$$10° < \gamma < 20° \tag{3}$$

where $\gamma$ is an angle of bending of a d-line axial chief ray by said transmission hologram.

18. The projection screen according to claim 12, wherein at a position of said magnified exit pupil, a difference in an entrance position between an optical axis of 700-nm wavelength and an optical axis of 400-nm wavelength is up to ½ of an exit pupil diameter.

19. The projection screen according to claim 11, wherein a difference in an angle of diffraction of an axial chief ray by said transmission hologram between light of 700-nm wavelength and light of 400-nm wavelength is up to 18°.

20. The projection screen according to claim 11, wherein each of the plurality of Fresnel surfaces is formed as a reflecting surface having positive power, and the projection screen satisfies the following condition:

$$0° < \beta < 45° \tag{4}$$

where $\beta$ is an angle of incidence of a d-line axial chief ray on the surface on which the plurality of Fresnel surfaces are formed.

21. The projection screen according to claim 11, which satisfies the following condition:

$$5° < \beta < 25° \tag{4-1}$$

where $\beta$ is an angle of incidence of a d-line axial chief ray on the surface on which the plurality of Fresnel surfaces are formed.

22. The projection screen according to claim 11, which satisfies the following condition:

$$0.01 < \gamma/\beta < 1,000 \tag{5}$$

where y is an angle of bending of a d-line axial chief ray by said transmission hologram, and P is an angle of incidence of a d-line axial chief ray on the surface on which the plurality of Fresnel surfaces are formed.

23. The projection screen according to claim 11, which satisfies the following condition:

$$0.5 < \gamma/\beta < 2 \tag{5-1}$$

where $\gamma$ is an angle of bending of a d-line axial chief ray by said transmission hologram, and $\beta$ is an angle of incidence of a d-line axial chief ray on the surface on which the plurality of Fresnel surfaces are formed.

* * * * *

UNITED STATES PATENT AND TRADEMARK OFFICE
CERTIFICATE OF CORRECTION

PATENT NO.       : 7,167,307 B2
APPLICATION NO.  : 10/913488
DATED            : January 23, 2007
INVENTOR(S)      : Takayoshi Togino Page 1 of 1

It is certified that error appears in the above-identified patent and that said Letters Patent is hereby corrected as shown below:

Column 16, line 5, change "where $\gamma y$ is an angle" to --where $\gamma$ is an angle--;

Signed and Sealed this

Fourteenth Day of August, 2007

JON W. DUDAS
*Director of the United States Patent and Trademark Office*